United States Patent

Hara

[19]

[11] Patent Number: 5,864,691
[45] Date of Patent: Jan. 26, 1999

[54] CENTRAL PROCESSING UNIT WITH A SELECTOR THAT BYPASSES CIRCUITS WHERE PROCESSING IS NOT REQUIRED

[75] Inventor: Kazuhiko Hara, Sanda, Japan

[73] Assignee: Ricoh Company, Ltd., Tokyo, Japan

[21] Appl. No.: 972,302

[22] Filed: Nov. 18, 1997

Related U.S. Application Data

[62] Division of Ser. No. 591,293, Jan. 25, 1996, Pat. No. 5,768,554.

[30] Foreign Application Priority Data

Feb. 2, 1995 [JP] Japan ........................................ 7-16273

[51] Int. Cl.⁶ ............................................. G06F 9/30
[52] U.S. Cl. ............................................. 395/387; 395/389
[58] Field of Search ..................................... 395/387, 384, 395/389

[56] References Cited

U.S. PATENT DOCUMENTS

| H1291 | 2/1994 | Hinton et al. ........................ | 395/800.23 |
|---|---|---|---|
| 5,594,923 | 1/1997 | Inoue et al. ........................... | 395/842 |
| 5,636,353 | 6/1997 | Ikenaga et al. ....................... | 395/394 |
| 5,651,125 | 7/1997 | Witt et al. ............................. | 395/394 |

*Primary Examiner*—Parshotam S. Lall
*Assistant Examiner*—Kenneth R. Coulter
*Attorney, Agent, or Firm*—Cooper & Dunham LLP

[57] ABSTRACT

First and second circuits store therein source and destination operand addressing information from an instruction code as input information of a main decoder, respectively. A third circuit stores therein information other than operand addressing information from the instruction code as input information of the main decoder. A predecoder analyzes the instruction code and controls states of the first, second and third circuits. A first selector determines which information is input to the main decoder, from the first circuit, the second circuit or the third circuit. A processing selecting circuit causes the first selector to select information for each instruction, in a basic sequence of the first circuit, the second circuit and then the third circuit. The processing selecting circuit controls the first selector so that, if a state of at least one of the first and second circuits indicates that 'processing is not required', the circuit of the state of the indication is not selected and a subsequent circuit is selected instead. The main decoder obtains the information from the first, second and third circuits and controls each component of the central processing unit.

3 Claims, 5 Drawing Sheets

FIG. 5

| PROCESSING BY OAC | SUPPLY SOURCE OPERAND DATA TO INTERNAL BUS | SUPPLY DESTINATION OPERAND DATA TO INTERNAL BUS | OBTAIN DATA FROM INTERNAL BUS AND STORE AS DESTINATION OPERAND |
|---|---|---|---|
| SIGNAL FROM MAIN DECODER | SD | DD | DDW |
| SAC STATE: 'IMMEDIATE DATA' | SUPPLY DATA FROM IDL TO INTERNAL BUS | — | — |
| SAC STATE: 'EXTERNAL MEMORY' | SUPPLY DATA FROM DILS TO INTERNAL BUS | — | — |
| SAC STATE: 'GENERAL PURPOSE REGISTER' | SUPPLY DATA FROM GENERAL PURPOSE REGISTER TO INTERNAL BUS | — | — |
| DAC STATE: 'EXTERNAL MEMORY' | — | SUPPLY DATA FROM DILS TO INTERNAL BUS | OBTAIN DATA FROM INTERNAL BUS AND STORE IT IN DOL |
| DAC STATE: 'GENERAL PURPOSE REGISTER' | — | SUPPLY DATA FROM GENERAL PURPOSE REGISTER TO INTERNAL BUS | OBTAIN DATA FROM INTERNAL BUS AND STORE IT IN GENERAL PURPOSE REGISTER |

CENTRAL PROCESSING UNIT WITH A SELECTOR THAT BYPASSES CIRCUITS WHERE PROCESSING IS NOT REQUIRED

This is a continuation division of application Ser. No. 08/591,293 filed Jan. 25, 1996, now U.S. Pat. No. 5,768,554.

BACKGROUND OF THE INVENTION

1. Field of the Invention

The present invention relates to a central processing unit (hereinafter abbreviated to a 'CPU') used in a system including a microprocessor and in a system including a sequencer, such as a DSP (Digital Signal Processor).

2. A CPU executes an operation according to a software program. The software program is a set of instructions and the operation is performed as a result of the instructions being executed.

Ordinarily, an instruction includes a combination of an operation (a type of the instruction) and an operand. The type of instruction indicates which operation the CPU should perform and the operand indicates data to be processed in the operation. Ordinarily, the data to be processed in the operation is often expressed using a location at which the data is stored in the operand. That is, actually, an operand may be information which is used for addressing the location of the data to be processed in the operation. There are various ways to indicate the location of data. Further, a number of operands included in a single instruction depends on a particular type of the instruction. For example, an operation instruction such as a logical sum OR, A|B→C, requires three operands A, B and C. In this case, it is preferable that a location of each of the three operands can be addressed without any restriction.

However, actually, there may be various restrictions on such addressing. For example, there may be a restriction concerning an instruction code length. If locations of three operands are individually addressed using operands, a total instruction code length including the operands is long. As a result, a software program including an instruction of the total instruction length has a large size, and a memory storing the software program should have a large storage capacity. Further, if an instruction of an instruction code length is long, a long time is required for reading and decoding the instruction and thus an efficiency of an operation may not be high. When each of the three operands has particular addressing to be performed therefor, a number of possible combinations of the three operands is the third power of a number of possible addressing manners for each data. If a number of types of instructions and number of combinations of operands are large, a number of combinations of the types of instructions and operands is very large.

The CPU has an internal software program integrated therein. Such an internal software program is used when the CPU analyzes an externally supplied software program and thus appropriately executes the externally supplied software program containing the above-described instructions. Such an internal software program is referred to as a microprogram. If a number of types of instructions and a number of combinations of operands are large, a number of combinations of the types of instructions and operands is very large, and the microprogram has a very large size accordingly. If the microprogram has a very large size, it may not be possible that the CPU has the microprogram integrated therein.

In order to reduce the number of combinations of operand addressing, a number of operands may be reduced to two from the three. Specifically, there is a method, referred to as a two operand method, in which, for example, in the logical sum OR, A|B→B. That is, in the above-mentioned expression A|B→C, the operand C is common with the operand B and thus A|B→B. An operand such as the operand C in this example is an operand which represents a result of the operation and is referred to as a destination operand. An operand such as the operand B in this example is an original operand and is referred to as a source operand. By this two operand method, addressing of operands can be completed only by addressing two operands such as those A and B in this example. Accordingly, in comparison to the case where the operands are three, such as those A, B and C, a number of combinations of operand addressing can be reduced. Although the two operand method has some restrictions, this method is a general method and is used in many CPUs on the market.

In execution of an instruction by a CPU using the two operand method, there are three states: a source operand address calculation state in which an address of a source operand is calculated; a destination operand address calculation state in which an address of a destination operand is calculated; and a operation performance state in which an operation is performed. In the above-described example of the logical sum OR, A|B→B, the source operand address calculation state calculates an address of A, the destination operand address calculation state calculates an address of B, and the operation performance state performs the operation of A|B and then stores the result in B. Further, there may be various instructions such as that which does not require any operand addressing, and that which requires addressing of only one of the source and destination operands.

It is preferable that a CPU can smoothly execute various instructions according to a microprogram having a small size.

SUMMARY OF THE INVENTION

An object of the present invention is to provide a CPU in which no restriction is imposed on addressing of operands, commands are smoothly executed, and a small-size microprogram can run sufficiently.

A central processing unit according to the present invention comprises:

a first circuit which stores therein source operand addressing information from an instruction code as input information of a main decoder, the instruction code being a code from a software program input therein;

a second circuit which stores therein destination operand addressing information from the instruction code as input information of the main decoder;

a third circuit which stores therein information other than operand addressing information from the instruction code as input information of the main decoder;

a predecoder which analyzes the instruction code and controls states of the first, second and third circuits;

a first selector which determines which information is input to the main decoder, the information stored in the first circuit, the information stored in the second circuit or the information stored in the third circuit;

a processing selecting circuit which causes the first selector to select information for each instruction, in a basic sequence of the information stored in the first circuit, the information stored in the second circuit and then the information stored in the third circuit, the processing selecting circuit setting timing according to signals from the main decoder, according to which timing a current selection is changed to a subsequent selection in the first selector;

the processing selecting circuit controlling the first selector so that, if a state of at least one of the first and second circuits indicates that 'processing is not required', the circuit of the state of the indication is not selected and a subsequent circuit is selected instead; and the main decoder which obtains the information from the first, second and third circuits and controls each component of the central processing unit.

In the above-described central processing unit, the source operand addressing information, destination operand addressing information and instruction operation performing information are set in the first, second and third circuits, respectively. Thereby, a combination between the source operand addressing, destination operand addressing and instruction operation performing can be freely determined.

Further, the first selector selects one of the information from the first circuit, information from the second circuit and information from the third circuit, and outputs the selected one to the main decoder. Thereby, a single information transfer path to the main decoder is a suitable information transfer path from the first, second and third circuits to the main decoder.

Further, the processing selecting circuit which controls the first selector selects a source of information to be supplied to the main decoder, for each instruction input thereto, in a basic sequence of the first, second and then third circuits. Thus, it is possible to simplify the processing selecting circuit.

Further, the processing selecting circuit monitors states of the first and second circuits and thus determines whether or not the states of the first and second circuits indicate that processing is not required. The processing selecting circuit skips over a circuit of the state indicating that processing is not required from selection and performs a subsequent selection. Thereby, it is possible to eliminate a time required for selecting a circuit of the state indicating that processing is rot required. For example, if an instruction does not include a source operand, the state of the first circuit indicates that processing is not required. Then, a selection of the first circuit is skipped over and the second circuit is then selected.

The central processing unit may further comprise means for storing therein the information selected by the first selector. Thereby, even when the main decoder is in a state for performing an instruction operation of a current instruction, it is possible to change states of the first, second and third circuits to be states for a subsequent instruction.

The central processing unit may further comprise a second selector which selects one of the information selected by the first selector and interrupt request information and outputs the selected information to the main decoder. Thereby, it is possible to respond to an interrupt request.

The central processing unit may be that wherein information concerning a state of the processing selecting circuit is input to the main decoder. Thereby, a microprogram of the main decoder can be produced such that directions to be output therefrom are determined according to the selection state of the processing selecting circuit.

The central processing unit may further comprise:

an internal bus for data transfer;

a register which inputs therein data from the internal bus and outputs therefrom data to the internal bus;

a first holding circuit which inputs data from the internal bus and temporarily stores the data therein, the data being data which will be written externally of the central processing unit;

a second holding circuit which reads data thereinto externally, temporarily stores the data therein and supplies the data to the internal bus;

a third holding circuit which temporarily stores therein immediate data from the software program input therein and supplies the immediate data to the internal bus; and an operand automatic circuit which, based on a signal from the main decoder and states of the first and second circuits, controls the register, and the first, second and third holding circuits.

In the central processing unit, the operand automatic circuit controls the register, and the first, second and third holding circuits to appropriately supply data. Thereby, the microprogram in the main decoder can be produced without distinction as to whether a source operand of an instruction is immediate data, stored in the register or stored in an external memory. Similarly, the microprogram in the main decoder can be produced without distinction as to whether a destination operand of an instruction is stored in the register or stored in an external memory. As a result, it is possible to miniaturize the microprogram and to shorten a time required for developing the microprogram.

The central processing circuit may be that wherein:

contents to be sent to the processing selecting circuit are equivalent between a case in which a source operand is stored in the register and a case in which no source operand is present; and contents to be sent to the processing selecting circuit are equivalent between a case in which a destination operand is stored in the register and a case in which no destination operand is present.

Thereby, single common information can be supplied effectively from the first circuit to the processing selecting circuit, whether 'no source operand exists' or 'a source operand is stored in the register'. Similarly, single common information can be supplied effectively from the second circuit to the processing selecting circuit, whether 'no destination operand exists' or 'a destination operand is stored in the register'. As a result, an amount of information to be prepared can be reduced and therefore a circuit structure including electric wiring can be miniaturized.

Other objects and further features of the present invention will become more apparent from the following detailed description when read in conjunction with the accompanying drawings.

BRIEF DESCRIPTION OF THE DRAWINGS

FIG. 5 illustrates a data transfer operation of an OAC in the second embodiment of the present invention.

DESCRIPTION OF PREFERRED EMBODIMENTS

Figure 1:
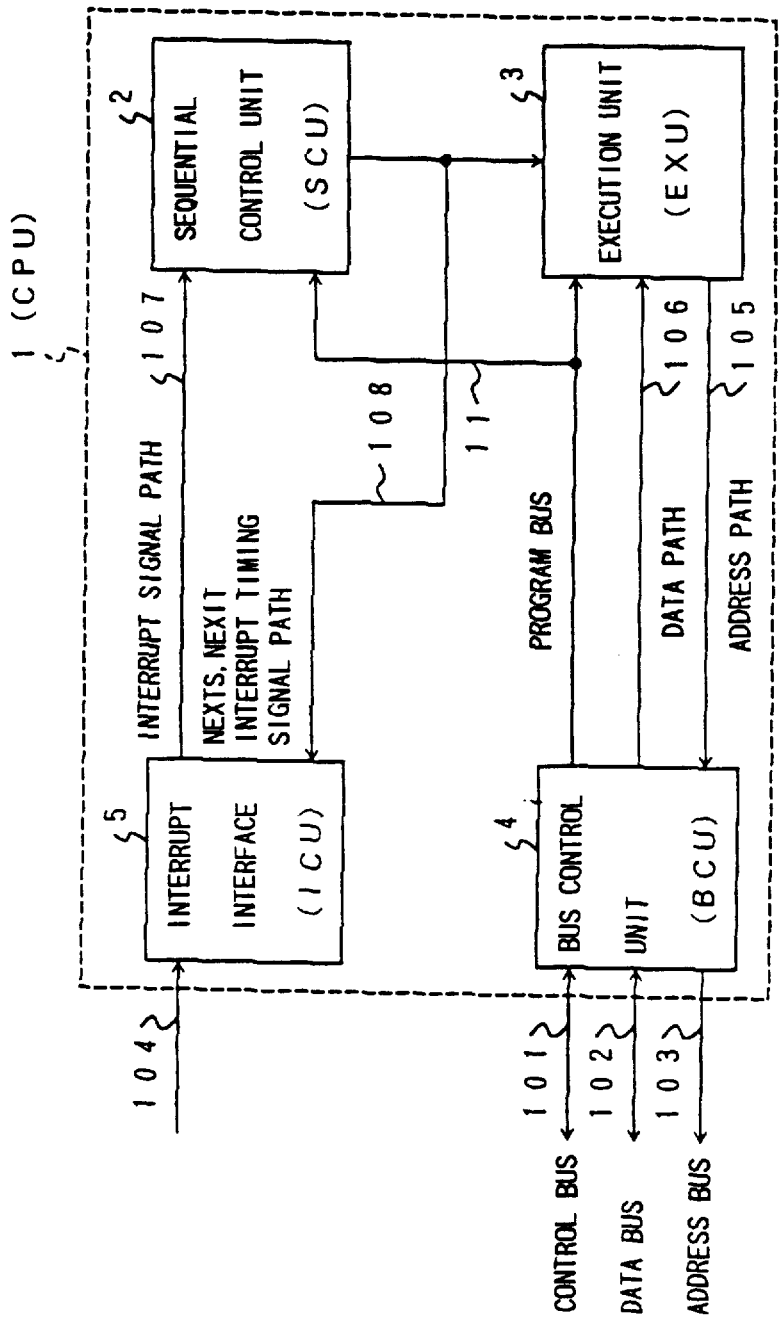
FIG. 1 shows a block diagram of a CPU in first and second embodiments of the present invention.

With reference to FIG. 1, a CPU 1 according to the present invention will now be described. The CPU 1 includes an SCU 2, an EXU 3, a bus control unit (hereinafter abbreviated to a 'BCU') 4, and an interrupt interface (hereinafter abbreviated to an 'ICU') 5. These units are connected with each other using various buses and paths (11, 105 through 108). The BCU 4 is externally connected using a control bus 101, a data bus 102 and an address bus 103.

Figure 2:
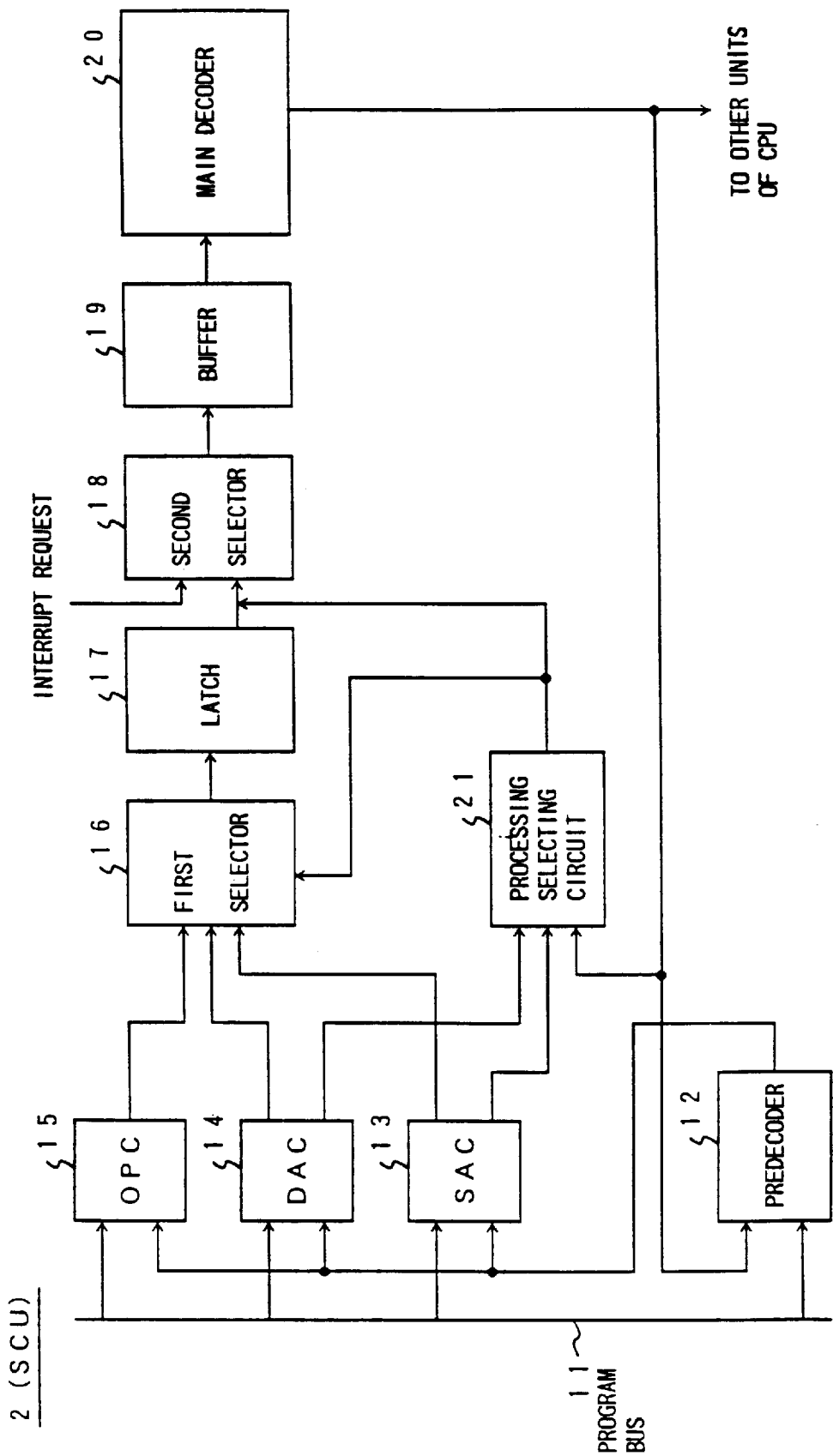
FIG. 2 shows a block diagram of a sequential control unit (hereinafter abbreviated to a 'SCU') of the CPU in the first and second embodiments of the present invention.

With reference to FIG. 2, the SCU 2 in the CPU 1 of the first embodiment of the present invention will now be described. An instruction to be executed by the CPU 1 is supplied to a program bus 11. The instruction is then input to a predecoder 12, a source addressing control circuit (hereinafter abbreviated to an 'SAC', a destination addressing control circuit (hereinafter abbreviated to a 'DAC') 14 and an operation control circuit (hereinafter abbreviated to an 'OPC') 15.

The predecoder 12, based on an instruction code of the instruction input thereto, analyzes a type and other necessary information concerning source operand addressing, a type and other necessary information concerning destination operand addressing and a type and other necessary information concerning operation of the instruction. If the analysis cannot be completed using an instruction code obtained through one instruction inputting operation, a necessary control is performed and thus a subsequent instruction code is input. The predecoder 12 operates and thus causes the information to be input to the SAC 13, DAC 14 and OPC 15.

Specifically, the predecoder 12 obtains a code of instruction from the program bus 11, and, according to the contents of the obtained code, updates contents being set in the SAC 13, DAC 14 and OPC 15. If the instruction is a single operand instruction, which is an instruction using only one of a source and destination operands, the predecoder 12 sets contents indicating 'processing unnecessary' in a respective one of the SAC 13 and DAC 14. Further, if the obtained code of instruction does not act well as necessary information, the predecoder 12 obtains a subsequent code of the instruction from the program bus 11 and supplies it to the SAC 13, DAC 14 and OPC 15. Instructions to obtain the subsequent code of the instruction are supplied by the predecoder 12 itself according to the contents of the code which were precedingly obtained. The predecoder 12 may obtain a plurality of codes of the instruction in a case such as that in which the instruction includes a set of a plurality of codes.

Thus, the predecoder 12 sets, in the SAC 13, information necessary for production of a source operand address; in the DAC 14, information necessary for production of a destination operand address; and in the OPC 15, the type and other necessary information concerning the operation of the instruction. After this operation has been completed, a processing selecting circuit 21 operates.

Based on directions supplied by the predecoder 12 and contents supplied from the program bus 11, the SAC 13, DAC 14 and OPC 15 produce data in a form appropriate as data to be input to a main decoder 20 (made of a programmable logic array or the like), and stores therein the produced data, respectively. Further, the SAC 13, DAC 14 and OPC 15 can send the stored data to a first selector 16.

The first selector 16 selects one item of three items of data which are sent from the SAC 13, DAC 14 and OPC 15 respectively, and outputs the selected item of data. The selection by the first selector 16 is performed according to directions supplied by the processing selecting circuit 21. The data output by the first selector 16 is stored and then output by a latch 17. The data output by the latch 17 is supplied to a second selector 18.

The second selector 18 adds information output by the processing selecting circuit 21 to the data output by the latch 17, and obtains data in a final form to be supplied to the main decoder 20. Specifically, whether or not an interrupt request has been supplied is determined. If an interrupt request has not been supplied to the second selector 18, the data to be supplied to the main decoder 20 includes the data output by the latch 17 without having undergone any content change. If an interrupt request has been supplied to the second selector 18, the data to be supplied to the main decoder 20 includes the data which was output from the latch 17 and then changed according to the contents of the supplied interrupt request. The final data to be supplied to the main decoder 20 is thus determined by the second selector 18, and is supplied to the main decoder 20 via a buffer 19.

The main decoder 20 uses a microprogram integrated therein and thus analyzes contents of the supplied data and outputs signals which control each component in the CPU 1. Part of the signals output therefrom is input to the predecoder 12 and thereby the predecoder 12 can know timing at which a subsequent code is to be input from the program bus 11. Further, part of the above-mentioned signals is input to the processing selecting circuit 21.

The processing selecting circuit 21 outputs to the first selector 16 a signal indicating which of information supplied by the SAC 13, information supplied by the DAC 14 and information supplied by the OPC 15 is selected. This selection is performed basically in a sequence of the SAC 13, DAC 14 and then OPC 15. However, some circuits may be skipped over in the selection. The processing selecting circuit 21 obtains information of a manner of the skipping over from the SAC 13 and DAC 14. This information is information indicating whether or not the contents previously set in the SAC 13 and DAC 14 are to be skipped over. According to such information, the processing selecting circuit 21 controls the first selector 16.

An operation of the CPU 1 is started and ended according to a signal output by the main decoder 20. When an operation in a new instruction has been started, basically, the SAC 13 is selected first, the DAC 14 is selected next and then the OPC 15 is selected. However, for example, if information is obtained indicating that the contents previously set in the SAC 13 are to be skipped over, data output by the DAC 14 is selected first.

With reference to FIG. 1, the EXU 3 receives a signal from the SCU 2 and performs a data operation and primary data storage. The BCU 4 reads data from and writes data to buses connected external to the CPU 1. The EXU 3 has a path 106 which is connected between the EXU 3 and BCU 4 and is used for transferring write and read delta between the EXU 3 and BCU 4. The EXU 3 further has a path 105 which is also connected between the EXU 3 and BCU 4 and is used to send address data produced by the EXU 3 to the BCU 4. The EXU 3 operates according to directions supplied by the SCU 2. Specifically, a signal output by the main decoder 20 is a signal carrying directions, according to which EXU 3 operates.

The BCU 4 performs control concerning data transfer between the CPU 1 and external interfaces, excepting control concerning an interrupt operation. Specifically, using a control bus 101, a data bus 102 and an address bus 103, the BCU accesses an external memory which stores a software program. The software program read into the CPU 1 is transferred to the SCU 2 and EXU 3 via the program bus 11. A path of the program bus 11 connected to the EXU 3 is used for directly transferring immediate data, which may be included in the software program, to the EXU 3.

The ICU 5 externally receives an interrupt request (which may be referred to as IRQ) and determines whether or not the received interrupt request is effective, specifically, determines whether or not the received interrupt request is to be disabled or enabled in a current state of the CPU 1. This determination is referred to as a mask determination. Generally, a CPU has an interrupt function also has a function of disabling a received IRQ. Disabling a received IRQ is referred to masking a received IRQ. Whether or not the CPU masks a received IRQ may be indicated by a flag of one or several bits. The mask determination is specifically determination whether or not the flag indicates masking a received IRQ.

If the interrupt request, has been accepted, a path 107 is used and an interrupt operation is sent to the SCU 2 via the path 107. A timing at which the ICU 5 accepts an interrupt request is set by a signal which is supplied from the SCU 2 to the ICU 5 via a path 108. This signal is NEXTI or NEXTS as shown in FIG. 1 and will be described later.

Operation of the CPU 1 will now be described.

All instructions and interrupt operations are previously programed in the main decoder 20. The main decoder 20 outputs directions indicating that 'a subsequent instruction should be executed' at the end of each operation of operations concerning the all instructions and interrupt operations. These directions are referred to as NEXTI. When NEXTI is supplied by the main decoder 20, the processing selecting circuit 21, basically selects the SAC 13 first, and the predecoder 12 obtains one code of instruction from the program bus 11. Simultaneously, the SAC 13, DAC 14 and OPC 15 input the same code therein from the program bus 11.

The predecoder 12, according to the contents of the code input therein, alters the contents set in the SAC 13, DAC 14 and OPC 15. For example, if the code indicates that the instruction is a one-operand instruction, which is an instruction using only one of the source and destination operands, the predecoder 12 sets, in a respective one of the SAC 13 and DAC 14, the contents that 'processing is not required'. After completing the setting or set content altering operation, the processing selecting circuit 21 operates.

As long as the contents of the SAC 13 are not that 'processing is not required', the processing selecting circuit 21 outputs directions for the first selector 16 to select the SAC 13. As a result, the contents of the SAC 13 are sent to the latch 17 via the first selector 16 and stored in the latch 17. The stored contents are sent to the second selector 18 together with a signal indicating a current state of the processing selecting circuit 21. In this case, the state of the processing selecting circuit 21 is a state in which a source operand address is produced. As long as any interrupt request is not supplied, the second selector 18 inputs the sent contents to the buffer 19 without change. The above-mentioned contents are input to the main decoder 20 from the buffer 19. Thus, the main decoder 20 receives from the processing selecting circuit 21 information that it is a stage in which the source operand address is produced, and from the latch 17 information, such as a type of addressing, necessary for producing the source operand address. In use of the received information, the main decoder 20 outputs directions to the EXU 3, according to a software program for producing the source operand address. The software program is obtained as a result of the main decoder 20 analyzing information input thereto as described above.

After completion of execution of the source operand address producing program by the EXU 3 according to the directions supplied by the main decoder 20, the main decoder 20 outputs a signal to the processing selecting circuit 21 indicating that 'a current operation moves to a subsequent stage'. This signal will be referred to as 'NEXTF', hereinafter. After receiving NEXTF, the processing selecting circuit 21, as long as the contents of the DAC 14 are not that 'processing is not required', moves to a DAC selection state in which a destination operand address is produced. According to directions by the processing selecting circuit 21 in the DAC selection state, the first selector 16 selects the DAC 14 and sends the contents of the DAC t4 to the latch 17. The latch 17 stores therein the sent contents. The stored contents are sent to the second selector 18 together with a signal indicating the current state of the processing selecting circuit 21. In this case, the state of the processing selecting circuit 21 is the state in which the destination operand address is produced. As long as any interrupt request is not supplied, the second selector 18 inputs the sent contents to the buffer 19 without change. The above-mentioned contents are input to the main decoder 20 from the buffer 19. Thus, the main decoder 20 receives from the processing selecting circuit 21 information that it is a stage in which the destination operand address is produced, and from the latch 17 information, such as a type of addressing, necessary for producing the destination operand address. In use of the received information, the main decoder 20 outputs directions to the EXU 3, according to a software program for producing the destination operand address. The software program is obtained as a result of the main decoder 20 analyzing information input thereto as described above.

After completion of execution of the destination operand address producing program by the EXU 3 according to the directions supplied by the main decoder 20, the main decoder 20 outputs the above-described signal NEXTF to the processing selecting circuit 21. After receiving NEXTF, the processing selecting circuit 21 moves to an OPC selection state in which an operation of the instruction is performed. According to directions by the processing selecting circuit 21 in the OPC selection state, the first selector 16 selects the OPC 15 and sends the contents of the OPC 15 to the latch 17. The latch 17 stores therein the sent contents. The stored contents are sent to the second selector 18 together with a signal indicating the current state of the processing selecting circuit 21. In this case, the state of the processing selecting circuit 21 is the state in which the operation of the instruction is performed. As long as any interrupt request is not supplied, the second selector 18 inputs the sent contents to the buffer 19 without change. The above-mentioned contents are input to the main decoder 20 from the buffer 19. Thus, the main decoder 20 receives from the processing selecting circuit 21 information that it is a stage in which the operation of the instruction is performed, and from the latch 17 information, such as a type of operation, necessary for performing the operation of the instruction. In use of the received information, the main decoder 20 outputs directions to the EXU 3, according to a software program for performing the operation of the instruction. The software program is obtained as a result of the main decoder 20 analyzing information input thereto as described above. After completion of execution of the instruction operation performing program by the EXU 3 according to the directions supplied by the main decoder 20, the main decoder 20 outputs the above-described signal NEXTI to the processing selecting circuit 21 and predecoder 12. Thereby, an operation concerning a subsequent instruction is started in the CPU 1.

If the contents of the SAC 13 are that 'processing is not required' as a result of a setting or set content altering operation being performed by the predecoder 12, the processing selecting circuit 21 enters the DAC selection state immediately after receiving NEXTI. Thereby, the main decoder 20 starts an operation concerning an instruction and first supplies directions for producing the destination operand address.

If the contents of the DAC 14 are that 'processing is not required' as a result of a setting or set content altering operation being performed by the predecoder 12, the processing selecting circuit 21 moves to the OPC selection state, in which an operation of an instruction is performed, from the SAC selection state.

If the contents of each of the SAC 13 and DAC 14 are that 'processing is not required' as a result of a setting or set content altering operation being performed by the predecoder 12, the processing selecting circuit 21 enters the OPC selection state immediately after receiving NEXTI. Thereby, the main decoder 20 starts an operation concerning an instruction and first supplies directions for performing the operation of the instruction.

A case where an interrupt request is supplied will now be described.

The interrupt request is output from the above-described ICU 5. Generally, a CPU does not accept an interrupt request only after execution of a current instruction has been completed and before execution of a subsequent instruction is started. That is, an interrupt operation may be performed during execution of an instruction. In this first embodiment, the CPU 1 inputs latest interrupt request information to the second selector 18 only when NEXTI is output. When NEXTI is not output, the ICU 5 operates so that a preceding interrupt request state is maintained. Thereby, an interrupt request signal is only updated after execution of a current instruction has been completed and before execution of a subsequent instruction is started. Thereby, an interrupt operation is not performed during execution of an instruction.

There may be a special instruction such as a string (sequence of characters) transfer instruction. In execution of such an instruction, the same operation is repeated and a number of repetitions is not determined when a CPU is produced. When such an instruction is executed, a considerable time is required for completion of the instruction execution. Therefore, if acceptance of an interrupt request is delayed until the instruction execution has been completed, a very long time may be required for acceptance of the interrupt request since the interrupt request occurred. If so, a real-time performance or an immediate processing performance of the CPU may be degraded. In order to prevent such a problem from occurring, only for a case of execution of such a special instruction, determination is performed between repeated instruction execution stages. The determination is a determination as to whether or not an interrupt request has been input to the ICU 5. If input of an interrupt request has been determined, the repetition of instruction execution is then terminated and an interrupt operation is performed. Such a method is a general method.

An interrupt operation for a case of execution of such a special instruction in the first embodiment of the present invention will now be described.

According to an instruction execution program of the main decoder 20, it is determined whether a current execution of an instruction is terminated or repeated. If it has been determined that the current execution of the instruction is terminated, NEXTI is output in an ordinary way. If it has been determined that the current execution of the instruction is repeated, the main decoder 20 outputs a signal to the ICU 5. The signal is a signal such that, in response to reception of the signal, the ICU 5 determines whether or not an interrupt request is input to the ICU 5. This signal is referred to as NEXTS. Each time the NEXTI or the NEXTS is output, the contents of a latest interrupt request input to the ICU 5 are supplied to and stored in the second selector 18. After NEXTI is output, a subsequent instruction is executed after an interrupt operation has been completed. However, after NEXTS is output, a subsequent instruction is not executed after the interrupt request is accepted and the interrupt operation is performed. After NEXTS is output and then an operation state is returned to an ordinary operation state from an interrupt operation state, the preceding instruction execution is repeated.

In summary, according to the first embodiment of the present invention, basically, an instruction is executed in a sequence of source operand address production, destination operand address production and then instruction operation performance. This is because a state of the processing selecting circuit 21 changes basically according to the above-mentioned sequence. When performance of at least one of the source operand address production and the destination operand address production is not required in an instruction execution, the performance not required is skipped over, and then a subsequent step is performed.

Further, information input to the main decoder 20 is independent for each step of the source operand address production, destination operand address production and then instruction operation performance. Similarly, a software program in the main decoder 20 is independent for each step of the source operand address production, destination operand address production and then instruction operation performance. Thereby, a combination between a source operand and a destination operand is not restricted by a relationship between the three states: a source operand address production state, a destination operand address production state and an instruction operation performance state. A combination between source operand addressing and destination operand addressing can be arbitrarily determined without restriction. Further, a combination between the source-operand-address-producing software program, destination-operand-address-producing software program and instruction-operation-performance software program can be arbitrarily determined without restriction by a relationship between the above-mentioned three states. As a result, software programs can be easily developed.

Further, when performance of a step of instruction execution is not required, the processing selecting circuit 21 does not enter a not-required-step performing state of the step, but immediately enters a subsequent state. Thereby, a time required for executing the instruction is effectively reduced.

Figure 3:
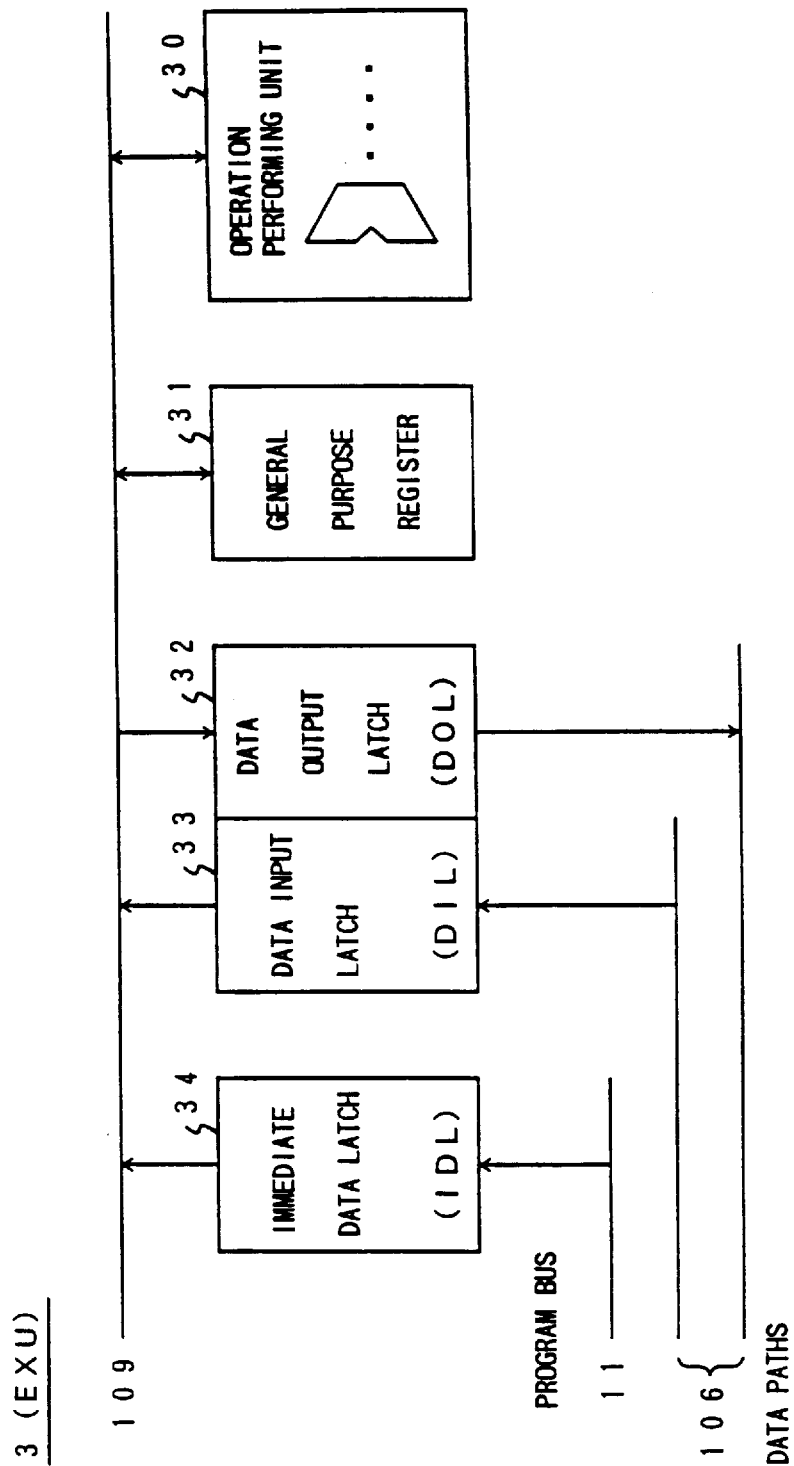
FIG. 3 shows an execution unit (hereinafter abbreviated to an 'EXU') of the CPU in the second embodiment of the present invention.

With reference to FIG. 3, the EXU 3 in the CPU 1 in the second embodiment will now be described. The EXU 3 includes an internal bus 109, an operation performing unit 30, a general purpose register 31, a data output latch (hereinafter, abbreviated as 'DOL') 32, a data input latch (hereinafter, abbreviated as 'DIL') 33, and in immediate data latch (hereinafter, abbreviated to 'IDL') 34.

The internal bus 109 may include a plurality of buses. However, for the sake of simplifying the description, the internal bus 109 includes a single bus in FIG. 3.

The operation performing unit 30, which includes an ALU (Arithmetic Logic Unit), reads data from the internal bus 109 and outputs a calculation result to the internal bus 109.

The general purpose register 31 stores therein data to be used in a calculation operation and a calculation result.

When a calculation result is written in a storage device external to the CPU 1, the DOL 32 is a latch used when the CPU 1 supplies the calculation result to the BCU 4 shown in FIG. 1. The DOL 32 outputs the calculation result to the path 106.

The BCU 4 receives data which has been read out from a storage device external to the CPU 1. The DIL 33 is used when the CPU 1 receives the data which has been received by the BCU 4. The DIL 33 receives the data from the path 106. The DIL 33 includes a portion (hereinafter, referred to as a DILS) which is used for source operands and a portion (hereinafter, referred to as a DILD) which is used for destination operands.

The BCU 4 controls data transfer from DOL 32 to the path 106 and data transfer from the path 106 to the DIL 33. Specifically, when the CPU 1 will write data in the external storage device and the BCU 4 can perform a data writing operation, the BCU 4 causes the data to be transferred from the DOL 32 to the BCU 4 via the path 106. When the CPU 1 will read data from the external storage device and the BCU 4 has completed reading of the data from the external storage device, the BCU 4 causes the data to be transferred from the BCU 4 to the DIL 33 via the path 106.

The IDL 34 is used when immediate data contained in a software program is supplied to the EXU 3. The IDL 34 receives the data from the program bus 11.

Thus, data input and output is performed between the internal bus 109 and each of the operation performing unit 30 and general purpose register 31. Data is input from the internal bus 109 to the DOL 32, and data is output from the DIL 33 to the internal bus 109.

Figure 4:
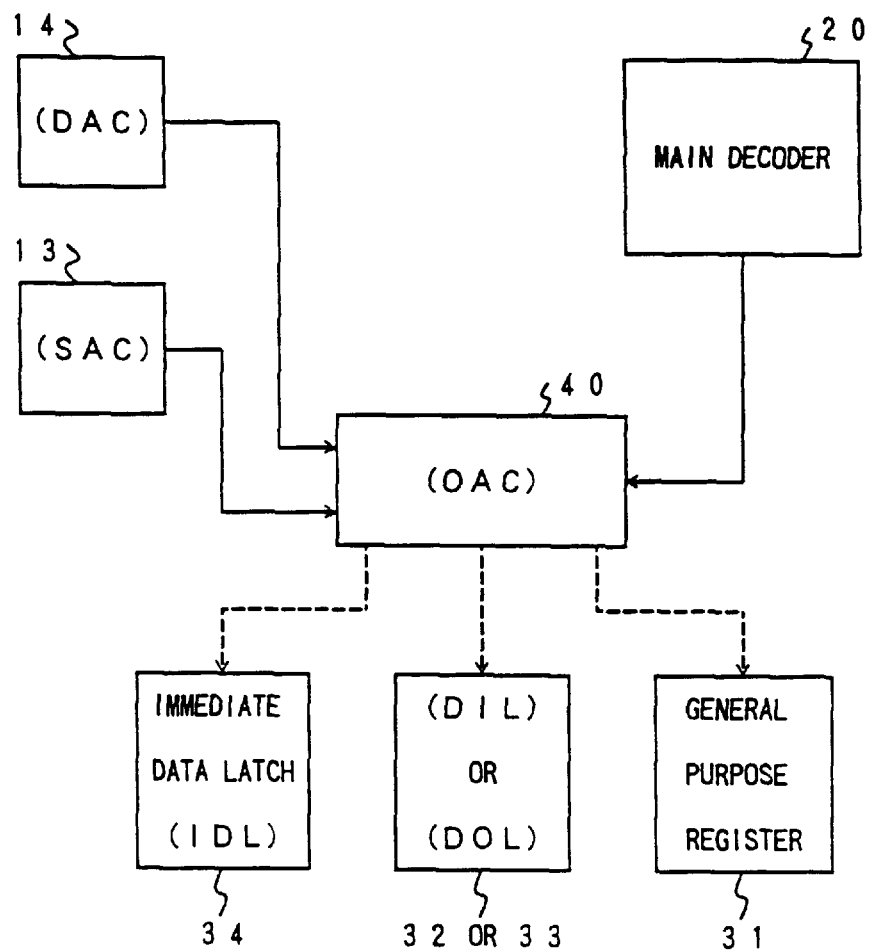
FIG. 4 shows a block diagram illustrating a relationship between an operand automatic selecting circuit (OAC) and other circuits in the CPU in the second embodiment of the present invention.

With reference to FIG. 4, an operand automatic selecting circuit (hereinafter, abbreviated to 'OAC') 40 (not shown in FIG. 1) in the CPU 1 in the second embodiment of the present invention will now be described. The OAC 40 monitors states of the SAC 13 and DAC 14 respectively. According to a signal from the main decoder 20 and the monitored states of the SAC 13 and DAC 14, the OAC 40 controls data input and output between the internal bus 109 and each of the general purpose register 31, DIL 32, DOL 33 and IDL 34.

The above-mentioned state of the SAC 13 monitored by the OAC 40 is whether a source operand addressing is to 'immediate data', to 'data stored in an external memory' or to 'data stored in the general purpose register 31'. The above-mentioned contents that 'processing is not required' of the SAC 13 correspond to the state of addressing to 'data stored in the general purpose register 31'.

The above-mentioned state of the DAC 14 monitored by the OAC 40 is whether a destination operand addressing is to 'data stored in an external memory' or to 'data stored in the general purpose register 31'. The above-mentioned contents that 'processing is not required' of the DAC 14 correspond to the state of addressing to 'data stored in the general purpose register 31'.

The signal supplied by the main decoder 20, which signal is used together with the monitored states of the SAC 13 and DAC 14 by the OAC 40 for controlling data input and output between the internal bus 109 and each of the general purpose register 31, DIL 32, DOL 33 and IDL 34, will now be described. This signal can be one of three signals: a signal (hereinafter, referred to as a SD) indicating 'to output source operand data to the internal bus'; a signal (hereinafter, referred to as a DD) indicating 'to output destination operand data to the internal bus'; and a signal (hereinafter, referred to as a DDW) indicating 'to obtain data from the internal bus and store it as the destination operand'.

An operation of the OAC 40 will now be described.

In general, source operand data of a source operand in an instruction can be obtained as a result of one of obtaining 'immediate data' contained in the instruction itself, addressing 'data stored in an external memory' and addressing 'data stored in the general purpose register 31'.

In a source operand address calculating state (above-mentioned SAC selection state), if addressing for a source operand in an instruction leads to 'immediate data', the immediate data contained in the instruction of a software program supplied via the program bus 11 is stored in the IDL 34 in the EXU 3.

If addressing for a source operand in an instruction leads to 'data stored in an external memory' in the source operand address calculating state, an address in the external memory is calculated, and, if necessary, objective data is read out from the external memory via the BCU 4 show in FIG. 1 and stored in the DILS of DIL 33.

If addressing for a source operand in an instruction leads to 'data stored in the general purpose register 31', nothing is performed in the source operand address calculating state. This state, in which nothing is performed as a result of addressing leading to the general purpose register 31, is equivalent to a state resulting from an instruction not including a source operand, and thus the contents that 'processing is not required' is set in the SAC 13.

In general, destination operand data of a destination operand in an instruction can be obtained as a result of either addressing 'data stored in an external memory' or addressing 'data stored in the general purpose register 31'.

In a destination operand address calculating state (above-mentioned DAC selection state), if addressing for a destination operand in an instruction leads to 'data stored in an external memory', an address in the external memory is calculated, and, if necessary, objective data is read out from the external memory via the BCU 4 shown in FIG. 1 and stored in the DILD of DIL 33.

If addressing for a destination operand in an instruction leads to 'data stored in the general purpose register 31', nothing is performed in the destination operand address calculating state. This state, in which nothing is performed as a result of addressing leading to the general purpose register 31, is equivalent to a state resulting from an instruction not including a source operand, and thus the contents that 'processing is not required' is set in the DAC 13.

Above-mentioned addressing for a source operand is previously set in SAC 13 and addressing for a destination operand is previously set in DAC 14, by the predecoder 12 as described in the description of the first embodiment.

The OAC 40 receives the above-signals SD, DD and DDW from the main decoder 20, and controls the data transfer from and to the general purpose register 31 and latches 32 through 34 as shown in FIG. 5.

The main decoder 20 outputs the signal SD, DD and DDW in an instruction operation performing state (above-mentioned OPC selection state).

In this state, only by outputting the signal SD, it is possible to cause source operand data to be supplied to the internal bus according to particular addressing for a source operand.

Specifically, if previously set contents of the SAC 13 indicate that source operand data is 'immediate data', the immediate data is stored in the IDL 34 as mentioned above in the SAC selection state. The OAC 40, which previously monitors the state of the SAC 13, thereby knows that the immediate data is stored in the IDL 34, obtains the immediate data from the IDL 34 and then supplies it to the internal bus 109.

If previously set contents of the SAC 13 indicate that source operand data is 'data stored in the external memory', the data is read out from the external memory and is stored in the DILS of DIL 33 as mentioned above in the SAC selection state. The OAC 40, which previously monitors the state of the SAC 13, thereby knows that the data is stored in the DILS of DIL 33, obtains the data from the DILS of DIL 33 and then supplies it to the internal bus 109.

If previously set contents of the SAC 13 indicate that source operand data is 'data stored in the general purpose register 31', nothing is performed as mentioned above in the SAC selection state. The OAC 40, which previously monitors the state of the SAC 13, thereby knows that the data is stored in the general purpose register 31, obtains the data from the general purpose register 31 and then supplies it to the internal bus 109.

If previously set contents of the DAC 14 indicate that destination operand data is 'data stored in the external memory', the data is read out from the external memory and is stored in the DILD of DIL 33 as mentioned above in the DAC selection state. The OAC 40, which previously monitors the state of the DAC 14, thereby knows that the data is stored in the DILD of DIL 33, obtains the data from the DILD of DIL 33 and then supplies it to the internal bus 109.

If previously set contents of the DAC 14 indicate that destination operand data is 'data stored in the general purpose register 31', nothing is performed as mentioned above in the DAC selection state. The OAC 40, which previously monitors the state of the DAC 14, thereby knows that the data is stored in the general purpose register 31, obtains the data from the general purpose register 31 and then supplies it to the internal bus 109.

The source operand data and destination operand data are thus supplied to the internal bus 109 in the instruction operation performing state. An instruction operation is performed using the source operand data and destination operand data. Then, a result of performing of the instruction operation should be obtained from the internal bus 109 and stored as the destination operand in the above-described two-operand method. By only outputting the signal DDW, it is possible to cause the result of the performing of the instruction operation to be obtained from the internal bus 109 and stored in an appropriate one of the DIL 33 and the general purpose register 31, according to particular addressing for the destination operand.

Specifically, if the previously set contents of the DAC 14 indicate that destination operand data is 'data stored in the external memory', the data is read out from the external memory and is used for the performing of the instruction operation as mentioned above. The OAC 40, which previously monitors the state of the DAC 14, thereby knows that the result of the performing of the instruction operation is to be returned to the external memory, obtains the result from the internal bus 109 and then stores it in the DOL 32. As described above, the DOL 32 is used when the CPU 1 supplies a calculation result to the BCU 4 shown in FIG. 1 and the BCU 4 is used for external data input and output. The result of the performing of the instruction operation stored in the DOL 32 is transferred to the external memory via the BCU 4.

If previously set contents of the DAC 14 indicate that destination operand data is 'data stored in the general purpose register 31', the data obtained from the general purpose register 31 is used for the performing of the instruction operation. The OAC 40, which previously monitors the state of the DAC 14, thereby knows that the result of the performing of the instruction operation is to be returned to the general purpose register 31, obtains the data from the internal bus 109 and then stores it in the general purpose register 31.

As a result, the main decoder 20 should output only three signals SD, DD and DDW simply, whether operand addressing leads to 'immediate data', 'data stored in the external memory' or 'data stored in the general purpose register 31'. Thereby, it is possible to simplify the microprogram which the main decoder 20 has therein for analyzing instructions input thereto and thereby generating directions to the EXU 3. Specifically, the microprogram should have only a simple set of three output signals SD, DD and DDW for operand addressing.

Further, as mentioned above, if addressing for a source operand or a destination operand of an instruction leads to 'data stored in the general purpose register', in a respective one of the SAC selection state and DAC selection state, no substantial time is required for the addressing because 'nothing is performed' in the state in this case. Although substantially nothing has been performed for the addressing in that state as mentioned above, a result of this addressing can be treated substantially in the same manner as that for a result of other addressing in the instruction operation performing state. Thereby, it is possible to effectively reduce the time required for the instruction execution even though the microprogram is simplified as mentioned above.

Further, when an instruction does not include a source operand, the predecoder 12 shown in FIG. 2 sets in the SAC 13 the contents of 'data stored in the general purpose register 31'. This setting is equivalent to the setting of the contents that 'processing is not required' because 'nothing is performed' in the SAC selection state if the contents of the SAC 13 are 'data stored in the general purpose register 31'. When an instruction does not include a destination operand, the predecoder 12 sets in the DAC 14 the contents of 'the general purpose register 31'. This setting is equivalent to the setting of the contents that 'processing is not required' because 'nothing is performed' in the DAC selection state if the contents of the DAC 14 are 'data stored in the general purpose register 31'. Thus, for operand addressing, two different types of states can be a common type, which two types of states are: a type of state of 'data stored in the general purpose register 31 addressing' and another type of state (s) of 'no (source and/or destination) operand (s) is (are) present'. Thereby, it is not necessary to separately prepare the two types of states for operand addressing. As a result, the microprogram of the main decoder 20 is simplified.

Thus, according to the present invention, operand addressing has no restriction imposed thereon, instruction execution can be smoothly performed and the microprogram can be miniaturized.

Further, the present invention is not limited to the above-described embodiments, and variations and modifications may be made without departing from the scope of the present invention.

What is claimed is:

1. A data processing system comprising:
   a plurality of addressing means for addressing to data according to an instruction input thereto;
   operation performing means for performing an operation using data addressed to by said addressing means;

skipping means for causing one of said plurality of addressing means to be skipped over from addressing to the data, according to the instruction input thereto.

2. A data processing system comprising:

addressing means for addressing to data according to an instruction input thereto;

data transfer means for monitoring said addressing means addressing to the data, said data transfer means transferring said data according to information obtained as a result of said monitoring; and operation performing means for performing an operation using the data transferred by said data transfer means.

3. A data processing system comprising:

addressing means for addressing to data according to an instruction input thereto;

operation performing means for performing an operation using the data addressed to by said addressing means; and forcibly setting means for forcibly setting addressing of said addressing means into addressing to a register when said instruction input thereto does not require any data.

* * * * *